(12) United States Patent
Kitamura et al.

(10) Patent No.: US 7,291,095 B2
(45) Date of Patent: Nov. 6, 2007

(54) AUTOMATIC START CONTROL APPARATUS OF VEHICLE

(75) Inventors: Toshio Kitamura, Ageo (JP); Yuuichi Ichikawa, Ageo (JP); Akihisa Hayashi, Ageo (JP); Isao Okamoto, Ageo (JP); Osamu Isobe, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 230 days.

(21) Appl. No.: 11/232,907

(22) Filed: Sep. 23, 2005

(65) Prior Publication Data

US 2006/0014611 A1    Jan. 19, 2006

Related U.S. Application Data

(63) Continuation of application No. PCT/JP2004/004267, filed on Mar. 26, 2004.

(30) Foreign Application Priority Data

Mar. 28, 2003    (JP)    ............................. 2003-092298

(51) Int. Cl.
*B60K 10/02*    (2006.01)

(52) U.S. Cl. ...................................... 477/181

(58) Field of Classification Search ................ 477/181; 123/179.3
See application file for complete search history.

(56) References Cited

U.S. PATENT DOCUMENTS

| | | | |
|---|---|---|---|
| 4,402,286 A * | 9/1983 | Pagel et al. | 123/179.3 |
| 4,534,326 A * | 8/1985 | Bowcott | 123/179.3 |
| 4,555,006 A * | 11/1985 | Uchida et al. | 477/167 |
| 6,371,889 B1 * | 4/2002 | Kuroda et al. | 477/181 |

FOREIGN PATENT DOCUMENTS

| | | |
|---|---|---|
| JP | 46-28604 | 8/1971 |
| JP | 60-060334 | 4/1985 |
| JP | 60-69855 | 5/1985 |
| JP | 2002-286054 | 10/2002 |

* cited by examiner

*Primary Examiner*—Dirk Wright
(74) *Attorney, Agent, or Firm*—Baker & Hostetler LLP

(57) ABSTRACT

An automatic start control apparatus of a vehicle having a function to automatically start the vehicle and not performing switching of a starting mode to a manual starting mode only by depression of a clutch pedal, but switching the starting mode to the manual starting mode upon operation of an accelerator pedal together with the clutch pedal thereby enhancing operability of automatic starting of the vehicle.

2 Claims, 5 Drawing Sheets

AUTOMATIC START CONTROL APPARATUS OF VEHICLE

CROSS REFERENCE TO RELATED APPLICATIONS

This application is a continuation of PCT/JP2004/004267, filed on Mar. 26, 2004.

FIELD OF THE INVENTION

The present invention relates to an automatic start control apparatus of a vehicle having a function for automatically starting the vehicle, and more particularly, to an automatic start control apparatus of a vehicle in which the starting mode is not switched to a manual starting mode only by depressing operation of a clutch pedal but is switched to the manual starting mode when an accelerator pedal, together with the clutch pedal, is operated, thereby enhancing the operability of automatic start of the vehicle.

BACKGROUND OF THE INVENTION

Conventionally, fully automatic transmissions having no clutch pedal have been developed in vehicles such as heavy-duty trucks. According to a vehicle having such a fully automatic transmission, it is possible to automatically start the vehicle such as a heavy duty truck only by depressing the accelerator pedal, but since a starting condition is largely varied, it is difficult to sufficiently satisfy the requirement of the starting performance from a driver only by automatic start control. That is, in the vehicle such as heavy-duty truck, since the weight of carrying load is largely varied, the starting condition of the vehicle largely changes in some cases. The starting condition of the vehicle also largely changes depending upon the road conditions such as whether a road on which the vehicle starts is a slope, a mud road, bumpy road and the like. Therefore, it is very difficult to reliably control the automatic start of the vehicle in accordance with all kinds of variations of the starting condition of the vehicle.

To solve this problem, there has been proposed an invention concerning a start control apparatus of a vehicle having an automatic start function of a vehicle by determining a starting condition of the vehicle. For example, as described in Japanese Unexamined Patent Publication No. 2002-286054, a conventional start control apparatus of a vehicle of this kind is provided with a clutch pedal capable of manually starting the vehicle, a clutch pedal sensor for detecting the depression of the clutch pedal, automatic start control means for automatically starting the vehicle, automatic start interrupting means which interrupts the control of the automatic start by the automatic start control means when only the depression of the clutch pedal is detected by the clutch pedal sensor and which switches the starting mode to the manual starting mode. In such a start control apparatus of the vehicle, the above-mentioned automatic start interrupting means is configured so that the control of the automatic start of the vehicle is interrupted only by the depressing operation of the clutch pedal, and the starting mode is switched to the manual start.

Further, the conventional start control apparatus of the vehicle has been provided with an alarming means which gives an alarm when the above-mentioned automatic start interrupting means is operated. If a driver depressed the clutch pedal to switch the automatic start mode to the manual starting mode, the depression of the clutch pedal is detected by the clutch pedal sensor, and the alarming means produces an alarm sound. With this, it is possible to avoid a condition such that the operation of the engine is unintentionally stopped due to a careless release of a foot from the clutch pedal by a driver.

In such a conventional start control apparatus of the vehicle, however, when the driver depresses the clutch pedal during control of the automatic start of the vehicle by mistake, although it is possible to avoid, by the production of the alarm sound, the unintentional stopping of the operation of the engine due to the driver's careless release of the foot from the clutch pedal, if the driver desires to return the starting mode to the automatic start after the starting mode is switched to the manual starting mode by the depressing operation of the clutch pedal, the driver must carry out a predetermined operation to reset the control of the automatic start. Thus, the operability of the automatic start of the vehicle is poor.

Hence, it is an object of the present invention to provide an automatic start control apparatus of a vehicle, which is capable of solving the above problem, and enhancing the operability of the automatic start of the vehicle through such an operation that the starting mode is not switched only by the depressing operation of the clutch pedal, and the starting mode is switched to the manual starting mode when the accelerator pedal, together with the clutch pedal, is operated.

SUMMARY OF THE INVENTION

To achieve the above object, the present invention provides an automatic start control apparatus of a vehicle comprising an accelerator pedal for controlling the rotating number of an engine, a throttle opening sensor for detecting a throttle opening which is opened by depression of the accelerator pedal, a clutch pedal configured to be capable of manually starting the vehicle, a clutch pedal sensor for detecting depression of the clutch pedal, automatic start control means for automatically starting the vehicle, and automatic start interrupting means which interrupts automatic start control by the automatic start control means and switches a starting mode to a manual starting mode when depression of the clutch pedal is detected by the clutch pedal sensor and depression of the accelerator pedal is detected by the throttle opening sensor.

With this constitution, when the depression of the clutch pedal is detected by the clutch pedal sensor and the depression of the accelerator pedal is detected by the throttle opening sensor, the automatic start interrupting means is operated to interrupt the automatic start control and to switch the starting mode from the mode of automatic start controlling to the manual starting mode. Therefore, even when a driver depresses the clutch pedal by mistake during the automatic start control, the starting mode is not switched to the manual starting mode, and the automatic start control continues. Thus, the operability of the automatic start of the vehicle can be enhanced. When the starting mode is switched to the manual starting mode, since the accelerator pedal, together with the clutch pedal, is depressed and the rotating number of the engine i.e., the engine speed is placed in a state where it is sufficiently increased. Thus, even if the clutch is engaged in such state, it is possible to avoid an unintentional stop of the engine.

The automatic start control apparatus of a vehicle according to the invention further comprises an alarming means for producing alarm when the automatic start interrupting means is operated. Hence, when the accelerator pedal, together with the clutch pedal, is operated to operate the automatic start interrupting means, the alarming means produces alarm and the driver is informed that the starting mode is switched to the manual starting mode.

DETAILED DESCRIPTION

Figure 1:
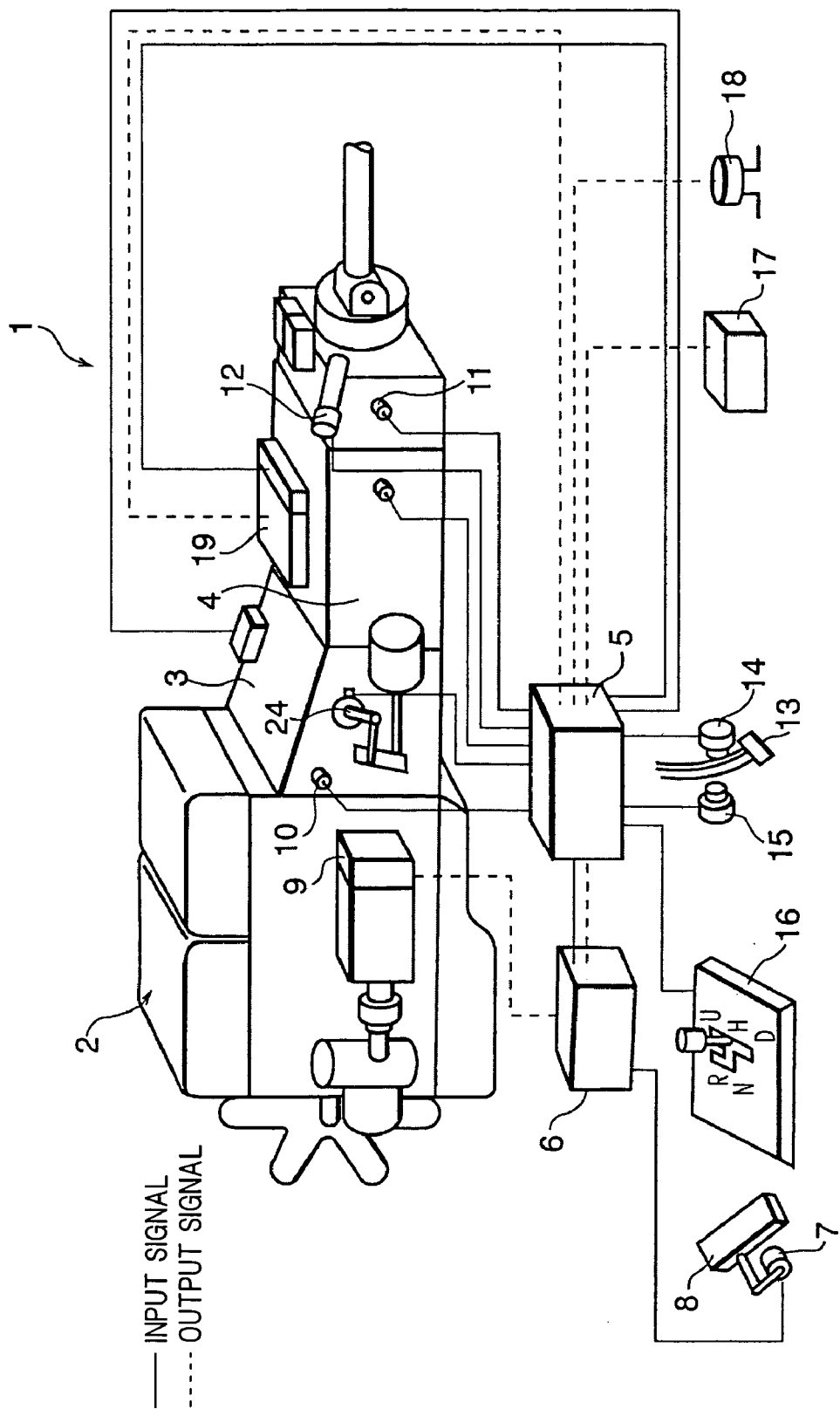
FIG. 1 is a perspective explanatory view showing an automatic start control apparatus of a vehicle according to an embodiment of the present invention, as the entire constitution including an engine.

FIG. 1 is a perspective explanatory view showing an automatic start control apparatus of a vehicle according to an embodiment of the present invention, as the entire constitution including an engine. The automatic start control apparatus 1 of a vehicle automatically controls a transmission in accordance with a running state detected during running of the vehicle such as a truck, a bus, a passenger car and the like. In FIG. 1, a transmission 4 is mounted so as to be connected to an engine 2 via a clutch 3. A transmission control unit 5 is connected to the transmission 4 by means of an electric wiring. An engine control unit 6 is connected to the engine 2 through an electric wiring. A throttle opening sensor 7 is connected to the engine control unit 6. The throttle opening sensor 7 is operated by depression of an accelerator pedal 8.

The throttle opening sensor 7 detects the extent of opening of the throttle, which is opened and closed by driver's operation of the accelerator pedal 8. The engine control unit 6 is engine control means which receives a signal indicating an extent of opening of the throttle, detected by the throttle opening sensor 7, and controls the operation of the engine 2. An output signal from the engine control unit 6 is sent to a fuel injection apparatus 9 mounted on the engine 2. Hence, if the accelerator pedal 8 is depressed, the rotating number of the engine 2 can be adjustably controlled. An actual throttle opening-extent signal detected by the throttle opening sensor 7 is transmitted to the transmission control unit 5 via the engine control unit 6.

The transmission control unit 5 is connected to the transmission 4 through an electric wiring. The transmission control unit 5 controls the transmission 4 in accordance with the running state of the vehicle. In the present invention, the transmission control unit 5 constitutes an automatic start control means which automatically starts the vehicle, and an automatic start interrupting means which interrupts the control of the automatic start of the vehicle and switches the starting mode to the manual starting mode. The transmission control unit 5 implements its controlling operation when signals from an engine speed sensor 10, a gear rotation speed sensor 11 mounted on the transmission 4 and a vehicle speed sensor 12 are input thereto, and when signals from a clutch-engaging switch 14 which is turned OFF when the clutch pedal 13 is depressed and a clutch-disengaging switch 15 which is turned ON when the clutch pedal 13 is depressed are input thereto. The clutch-engaging switch 14 and the clutch-disengaging switch 15 constitute a clutch pedal sensor. A shift tower 16 is connected to the transmission control unit 5. The shift tower 16 has a shift lever for shifting gears of the transmission 4.

A control contents-signal from the transmission control unit 5 is transmitted to the engine control unit 6. The control contents-signal is transmitted to a transmission actuator sensor 19 which detects a gear shift, and enables it to switch the starting mode between the automatic starting mode and the manual starting mode of the vehicle, and the signal is also transmitted to a display monitor 17 and a buzzer 18, so that the driver is informed of the signal. The display monitor 17 and the buzzer 18 constitute the alarming means.

Figure 2:
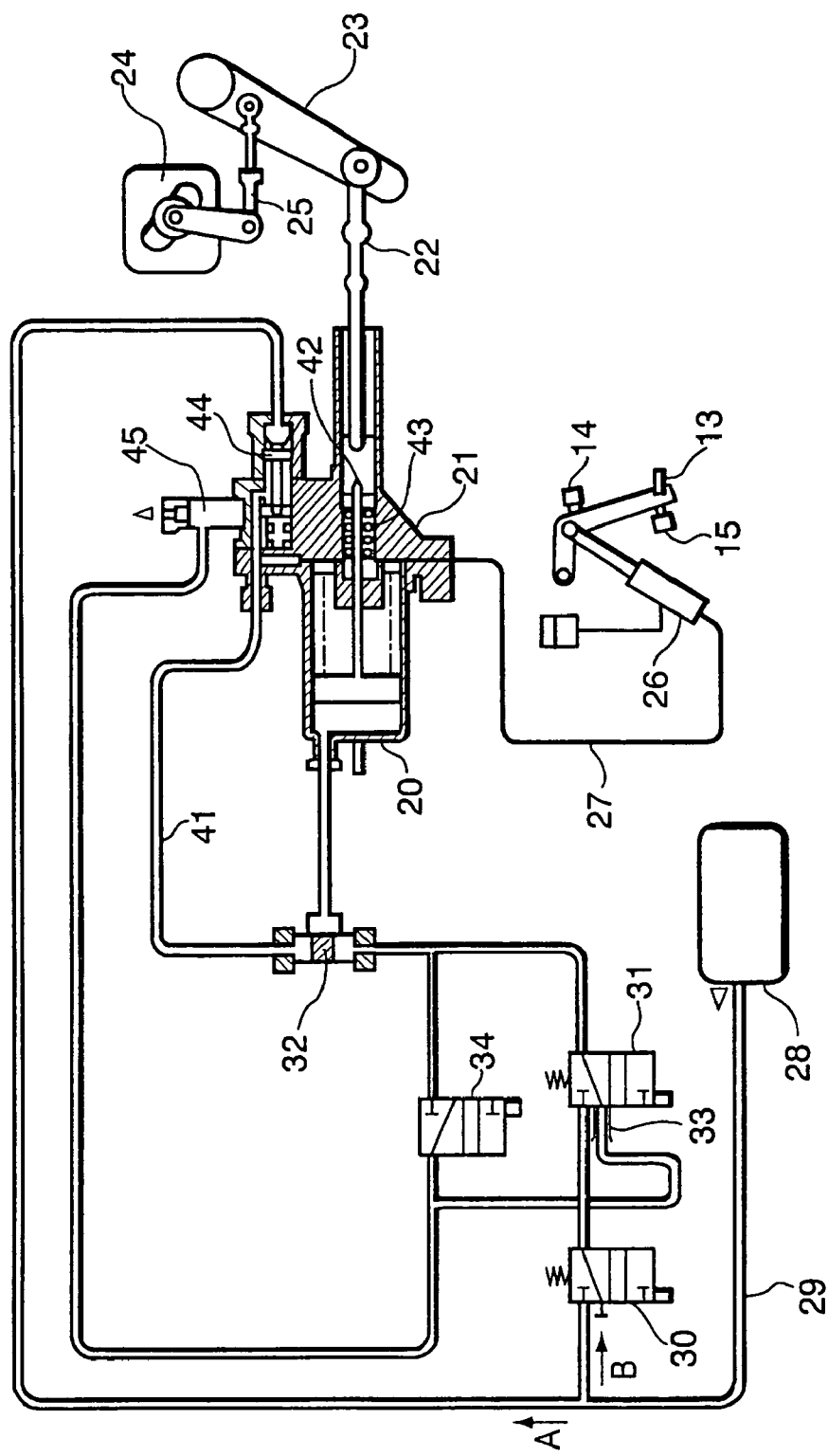
FIG. 2 is a diagrammatic view showing a clutch actuator which controls the operation of a clutch shown in FIG. 1.

FIG. 2 is a view showing a practical concept of the clutch actuator which controls the operation of the clutch 3 shown in FIG. 1. In the clutch actuator, a link 22 of a hydraulic cylinder 21 having a clutch booster 20 is connected to an outer lever 23 of the clutch 3 (see FIG. 1). A clutch stroke sensor 24 is connected to the outer lever 23 via a link 25.

A master cylinder 26 connected to the clutch pedal 13 is connected to the clutch booster 20 through a hydraulic circuit 27. High pressure gas is stored in an air reservoir 28. The air reservoir 28 is connected to a clutch-disengaging magnetic valve 30 through an air circuit 29. The clutch-disengaging magnetic valve 30 is an air-supply valve. A double-check valve 32 is connected to the clutch-disengaging magnetic valve 30 via a clutch holding magnetic valve 31.

A clutch-engaging magnetic valve 34 which acts as an exhaust valve is connected to an exhaust side of the clutch holding magnetic valve 31 via an orifice 33. The clutch-engaging magnetic valve 34 is connected to the double-check valve 32 and also to the clutch holding magnetic valve 31. A central connecting port of the double-check valve 32 is fluidly connected to the clutch booster 20. At this stage, the clutch holding magnetic valve 31 and the clutch-engaging magnetic valve 34 which are connected to one of the connecting ports of the double-check valve 32 are also connected, at their opposite ends, to a connecting portion, which is in turn connected to an exhaust breather 45 of the clutch booster 20.

Figure 3:
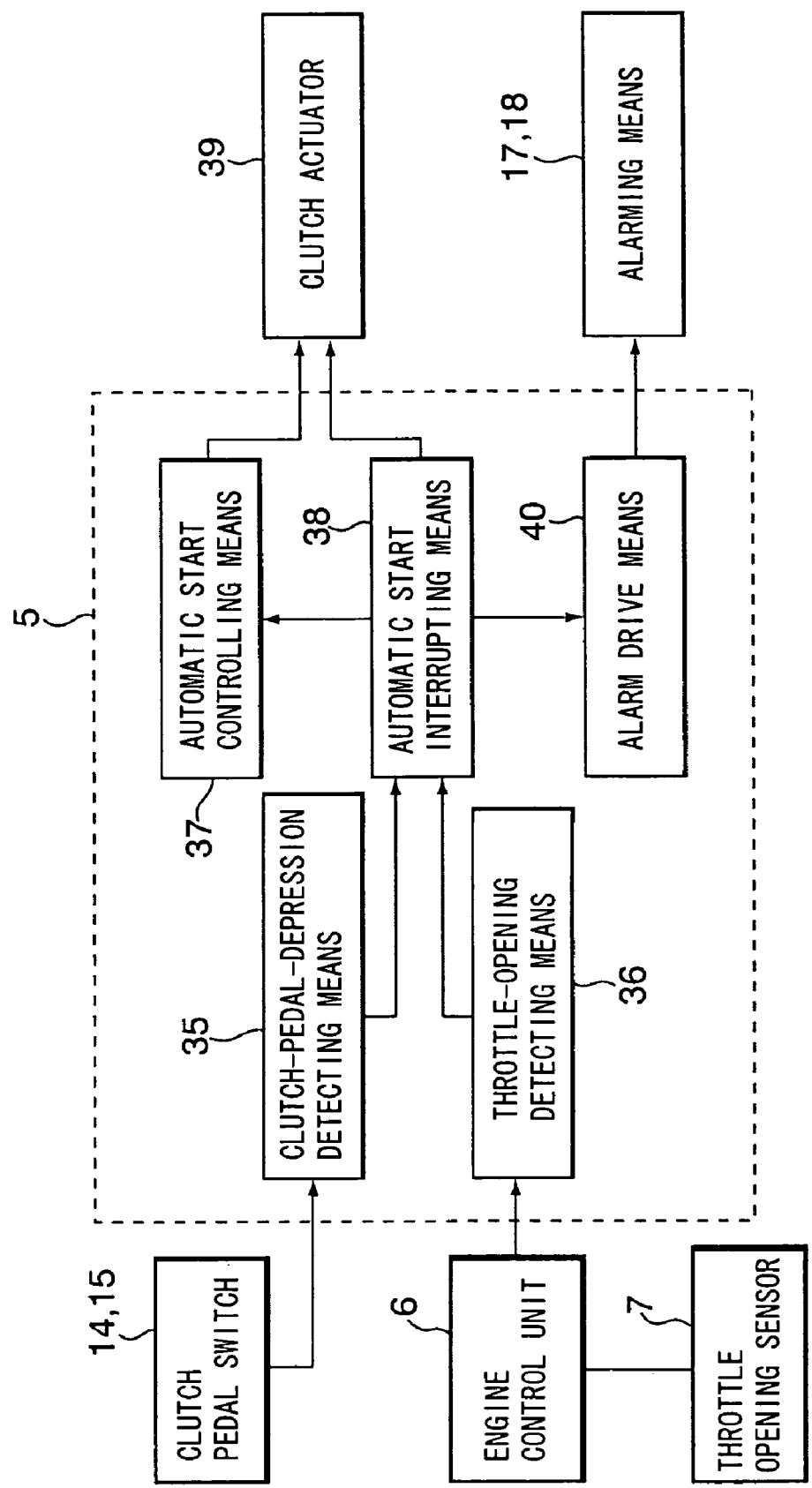
FIG. 3 is a block diagram showing the automatic start control apparatus of a vehicle.

FIG. 3 is a block diagram showing the automatic start control apparatus 1 of the vehicle shown in FIG. 1. In FIG. 3, the transmission control unit 5 includes clutch pedal depression detecting means 35, throttle opening detecting means 36, automatic start controlling means 37, automatic start interrupting means 38 and alarm drive means 40. The clutch pedal depression detecting means 35 is a circuit means which receives signals from the clutch pedal switches 14 and 15 and detects the depression of the clutch pedal 13 (see FIG. 1). The throttle opening detecting means 36 receives a signal from the engine control unit 6. The engine control unit 6 receives a signal from the throttle opening sensor 7 which detects the throttle opening caused by the depression of the accelerator pedal 8 (see FIG. 1).

The automatic start controlling means 37 controls the clutch for automatically starting the vehicle, and outputs a control-contents signal to a clutch actuator 39. The automatic start interrupting means 38 receives signals from the clutch pedal depression detecting means 35 and the throttle opening detecting means 36, outputs the control-contents signal produced based on these input signals to the automatic start controlling means 37, the clutch actuator 39 and the alarm drive means 40. The alarm drive means 40 outputs an alarm drive signal to the alarming means 17 and 18 at the time of operation of the automatic start interrupting means 38. Thus, the alarming means 17 and 18 produce alarms so that a driver can pay attention to the operation of the automatic start interrupting means 38.

Figure 5:
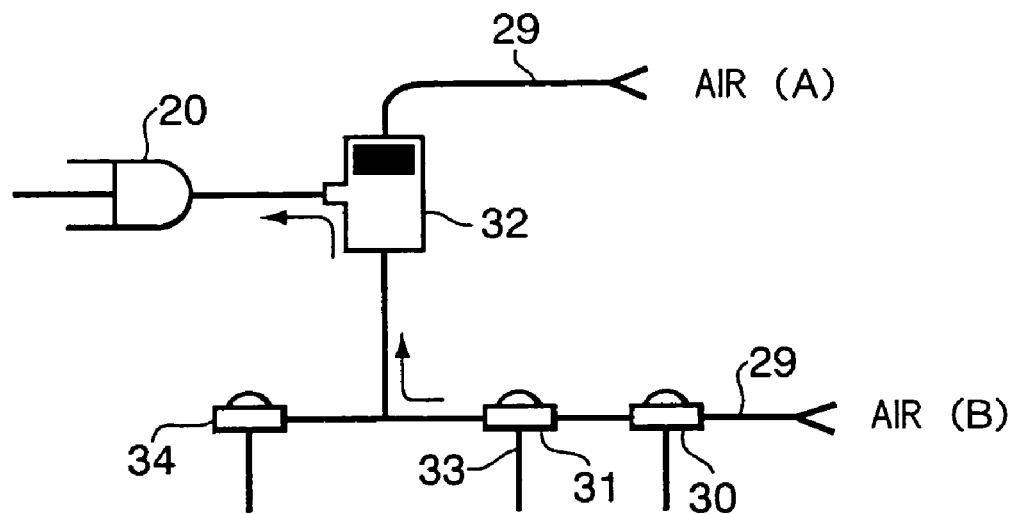
FIG. 5 is a schematic explanatory view showing flow of air of the clutch actuator shown in FIG. 2 at the time of controlling the automatic starting operation.

Here, a start-standby state is a state in which the clutch-disengaging magnetic valve 30 and the clutch holding magnetic valve 31 of the clutch actuator are turned on as shown in FIG. 5. Hence, air is sent to the clutch booster 20 through the double-check valve 32 from the side B (control side) of the air circuit 29, and the clutch 3 shown in FIG. 1 is disengaged.

If the clutch 3 is disengaged, the clutch-disengaging magnetic valve 30 shown in FIG. 5 is turned off and the communication is cut off, air supply is stopped, and the starting gear is immediately set. At that time, a free piston 42 of the hydraulic cylinder 21 connected to the clutch pedal 13 shown in FIG. 2 is urged by a spring 43 so as to remain unmoved. Thus, even if the clutch 3 is depressed by the clutch pedal 13 shown in FIG. 1, only compression of the spring 43 due to pushing occurs by the hydraulic pressure generated in the hydraulic circuit 27, and any increase in a hydraulic pressure within the hydraulic cylinder 21 does not occur. Thus, air for manual operation is not sent from a relay valve 44 through a pipe 41, the double-check valve 32 stays on the automatic side, and the clutch can not be operated manually.

In this embodiment, the automatic start interrupting means 38 shown in FIG. 3 releases the start-standby state, or interrupts the control of the automatic start by the automatic start controlling means 37 and outputs the control-contents signal to the clutch actuator 39 to switch the starting mode to the manual starting mode when the depression of the clutch pedal 13 (see FIG. 1) is detected by a signal from the clutch pedal depression detecting means 35 and depression of the accelerator pedal 8 (see FIG. 1) is detected by a signal from the throttle opening detecting means 36. More specifically, the clutch-engaging magnetic valve 34 shown in FIG. 2 is shifted to be opened to thereby permit air to be exhausted from the clutch booster 20. Hence, the link 22 is urged to move back toward the clutch-connection side by the action of the spring of the clutch. If the driver continues depression of the clutch pedal 13, a hydraulic pressure is generated in the hydraulic cylinder 21, and therefore, air for manual operation is sent from the relay valve 44 of the clutch booster 20 through the pipe 41. Therefore, the clutch 3 can be operated by the clutch pedal 13, and it is possible to manually start the vehicle.

When the automatic start interrupting means 38 shown in FIG. 3 is operated and the starting mode is switched to the manual starting mode, the accelerator pedal 8 together with the clutch pedal 13 shown in FIG. 1 is depressed, and the rotating number of the engine 2 sufficiently increases. Therefore, when the clutch is brought into engagement in this state, it is possible to avoid such a state that the operation of the engine is unintentionally stopped.

Figure 4:
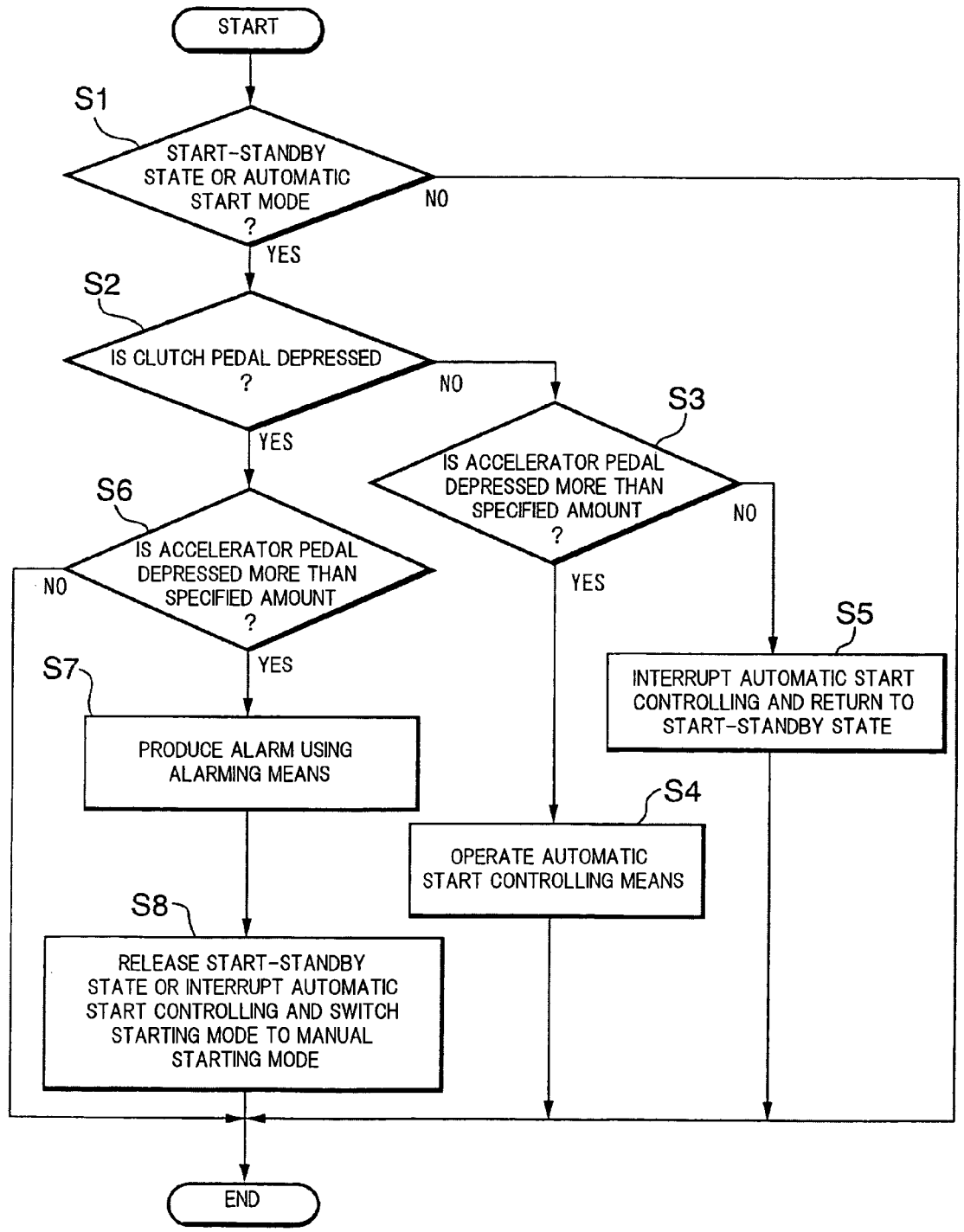
FIG. 4 is a flowchart showing the operation of the automatic start control apparatus of the vehicle.
Figure 6:
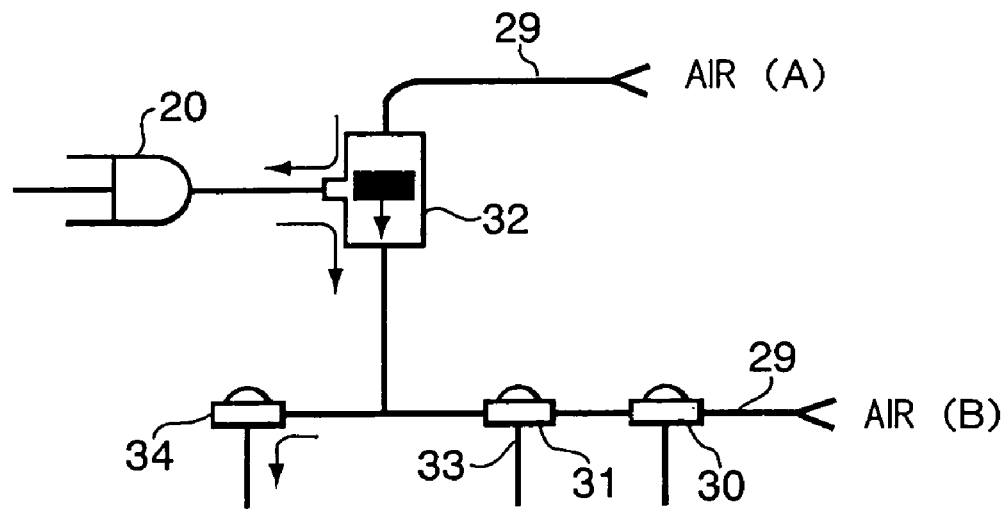
FIG. 6 is an explanatory view showing flow of air of the clutch actuator shown in FIG. 2, at the time of the manual start control.

Next, a description of the operation of the automatic start control apparatus 1 of a vehicle having the above-described constitution will be provided with reference to FIGS. 4 through 6. FIG. 4 is a flowchart showing the operation of the automatic start control apparatus 1 of a vehicle. First, it is determined whether the vehicle is in the start-standby state or the automatic start controlling means 37 (see FIG. 3) is in the startup state (step S1). When the vehicle is in the start-standby state or the automatic start controlling means 37 is in the startup state, the procedure proceeds from step S1 along "YES" and it is determined whether the clutch pedal 13 is depressed (step S2). Here, if it is determined that the clutch pedal 13 is not depressed, the procedure proceeds along "NO" from step S2, and it is determined whether the accelerator pedal 8 is depressed by more than a specified amount (step S3). If it is determined that the accelerator pedal 8 is depressed by more than the specified amount, the procedure proceeds along "YES" from step S3, and the automatic start controlling means 37 is operated (step S4). When it is determined that the accelerator pedal 8 is not depressed by more than the specified amount, the procedure proceeds along "NO" from step S3, the operation of the automatic start controlling is interrupted to be returned to the start-standby state (step S5).

To the contrary, if it is determined that the clutch pedal 13 is depressed in step S2 in FIG. 4, the procedure proceeds along "YES", and it is determined whether the accelerator pedal 8 is depressed by more than a specified amount (step S6). If it is determined that the accelerator pedal 8 is not depressed by more than the specified amount, the procedure proceeds along "NO" from step S6, and the control is completed (end). That is, even when the driver depresses the clutch pedal 13 by mistake during the start-standby state or the automatic start controlling in step S2, if the driver does not depress the accelerator pedal 8 and releases the clutch pedal 13, it is determined that the driver does not desire to do the manual-clutch starting, the starting mode is not switched to the manual starting mode, and the start-standby state or the automatic start controlling is maintained.

Hereby, even when the driver releases its foot from the clutch pedal 13 carelessly, the operation of the engine 2 is not unintentionally stopped. Thus, as soon as the driver depresses the accelerator pedal 8, the automatic start controlling immediately comes into operation and it is possible to automatically start the vehicle. Even when the driver depresses the clutch pedal 13 by mistake during the automatic start controlling, the starting mode is not switched to the manual starting mode. Therefore, unlike the conventional technique, it is unnecessary to reset the automatic start controlling and to again carry out the predetermined operation to obtain the start-standby state. Thus, the operability of the automatic starting of the vehicle can be enhanced.

On the other hand, if it is determined that the accelerator pedal 8 is depressed by more than the specified amount in step S6, the procedure proceeds along "YES" from step S6, and the alarming means 17 and 18 produce alarm sound (step S7). At the same time, the automatic start interrupting means 38 (see FIG. 3) is operated and releases the start-standby state or interrupts the automatic start controlling carried out by the automatic start controlling means 37 to thereby permit air to be exhausted from the clutch booster 20, and the starting mode is switched to the manual starting mode (step S8).

That is, in the start-standby state or the state in which the automatic start control is interrupted, air on the B side (control side) of the air circuit 29 is exhausted from the clutch-engaging magnetic valve 34, and the double-check valve 32 is switched to the A side (manual side) as shown in FIG. 6. Hence, air from the A side of the air circuit 29 is delivered to the clutch booster 20 via the double-check valve 32 and thus, the clutch 3 can be operated by the clutch pedal 13 shown in FIG. 1. Hereby, if the driver releases the clutch pedal 13 while depressing the accelerator pedal 8, it is determined that the driver desires to do the manual-clutch starting in step S6 in FIG. 4, the start-standby state or the automatic start controlling is interrupted and the starting mode is switched to the manual starting mode, and a normal manual starting can be carried out. Therefore, the operability of the automatic starting of the vehicle can be enhanced.

As described hereinbefore, according to the automatic start control apparatus 1 of a vehicle, when the depression of the clutch pedal 13 shown in FIG. 1 is detected and when the depression of the accelerator pedal 8 is detected, the automatic start interrupting means 38 shown in FIG. 3 is operated, so that the start-standby state or the controlling operation by the automatic start controlling means 37 is interrupted and the starting mode is switched to the manual starting mode. When the automatic start interrupting means 38 is operated in this manner, the alarm drive means 40 issues an alarm and the driver is informed that the starting mode is switched to the manual starting mode. Therefore, safety of the driving of vehicle can be enhanced. When the automatic start interrupting means 38 is operated and when the starting mode is switched to the manual starting mode, since the accelerator pedal 8 together with the clutch pedal 13 shown in FIG. 1 has been depressed, the rotating number of the engine 2 has come to a sufficiently increased state. Therefore, under such condition, when the clutch 3 is brought into engagement, any unintentional stopping of the operation of the engine can be avoided.

In the foregoing, although the clutch 3 shown in FIG. 1 is exampled as a normal dry clutch in the above description, the present invention is not exclusively limited to this, and the invention may be applied to a wet clutch. As the clutch actuator shown in FIG. 2, pressure air of the clutch booster 20 may be exhausted by electromagnetic proportional air pressure control valve instead of a magnetic valve. The operation of the clutch booster 20 is not limited to the shown air-controlled type, and may alternatively be formed as a hydraulic controlling type.

The invention claimed is:

1. An automatic start control apparatus of a vehicle comprising:
   an accelerator pedal provided for controlling the rotating number of an engine;
   a throttle opening sensor provided for detecting a throttle opening according to depression of the accelerator pedal;
   a clutch pedal arranged for being capable of manually starting the vehicle;
   a clutch pedal sensor provided for detecting depression of the clutch pedal;
   an automatic start controlling means provided for automatically starting the vehicle; and
   an automatic start interrupting means provided for interrupting automatic start controlling by the automatic start controlling means and for switching a starting mode to a manual starting mode when depression of the clutch pedal is detected by the clutch pedal sensor and depression of the accelerator pedal is detected by the throttle opening sensor.

2. The automatic start control apparatus of a vehicle according to claim 1, further comprising alarming means provided for being capable of producing an alarm when the automatic start interrupting means is operated.

* * * * *